United States Patent
Bremmer et al.

(10) Patent No.: US 10,821,784 B2
(45) Date of Patent: Nov. 3, 2020

(54) VEHICLE TYRE WITH ENHANCED BEAD CONTOUR

(71) Applicant: Apollo Tyres Global R&D B.V., Enschede (NL)

(72) Inventors: Paulus Bremmer, Enschede (NL); Antoon Johannes Hendrikus Spreeuweberg, Lettele (NL)

(73) Assignee: APOLLO TYRES GLOBAL R&D B.V., Enschede (NL)

( * ) Notice: Subject to any disclaimer, the term of this patent is extended or adjusted under 35 U.S.C. 154(b) by 566 days.

(21) Appl. No.: 15/442,058

(22) Filed: Feb. 24, 2017

(65) Prior Publication Data
US 2017/0246920 A1     Aug. 31, 2017

(30) Foreign Application Priority Data

Feb. 26, 2016   (GB) .................................. 1603377.1

(51) Int. Cl.
*B60C 15/024*   (2006.01)
*B60B 21/10*    (2006.01)

(52) U.S. Cl.
CPC .......... *B60C 15/024* (2013.01); *B60B 21/102* (2013.01); *B60B 21/104* (2013.01); *B60C 2015/0245* (2013.01)

(58) Field of Classification Search
CPC . B60C 15/024; B60C 15/0245; B60B 21/102; B60B 21/104
See application file for complete search history.

(56) References Cited

U.S. PATENT DOCUMENTS

| | | | |
|---|---|---|---|
| 2,825,383 A | 3/1958 | Spelman | |
| 5,460,214 A * | 10/1995 | Fujita | B60C 15/024 |
| | | | 152/540 |
| 6,910,513 B2 | 6/2005 | Ferlin | |
| 2005/0161140 A1 | 7/2005 | Kuchner et al. | |
| 2009/0000714 A1 | 1/2009 | Ohara | |

FOREIGN PATENT DOCUMENTS

| | | |
|---|---|---|
| DE | 9 38 767 C | 2/1956 |
| EP | 0 776 776 A1 | 6/1997 |
| EP | 1 798 073 A1 | 6/2007 |
| EP | 2 373 496 | 7/2010 |
| FR | 1138358 A | 6/1957 |
| FR | 2406530 A1 | 5/1979 |
| JP | 2005-186672 A | 7/2005 |

(Continued)

*Primary Examiner* — Jacob T Minskey
*Assistant Examiner* — Melody Tsui
(74) *Attorney, Agent, or Firm* — Renner, Otto, Boisselle & Sklar, LLP

(57) ABSTRACT

A pneumatic tyre comprises a tread portion, a pair of opposing sidewall portions and a pair of opposing bead portions, the tread portion extending radially outwards from the sidewall portions and the sidewall portions extending radially outwards from the bead portions, wherein each bead portion comprises an axially inward side and an axially outward side which are joined at a base of the bead portion and each axially outward side of the bead portion comprises a concave region extending axially inwards. Each concave region further comprises a convex region located within the concave region which extends axially outwards.

10 Claims, 4 Drawing Sheets

(56) References Cited

FOREIGN PATENT DOCUMENTS

Figure 1:
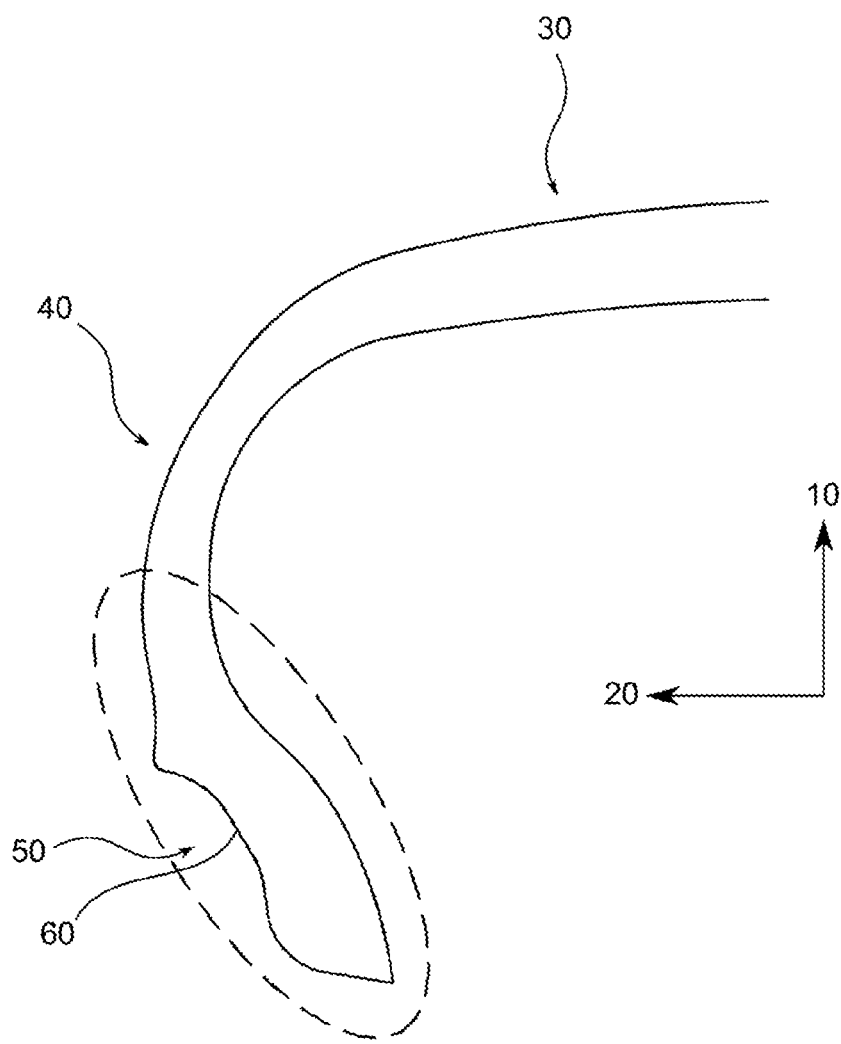

| | | | | |
|---|---|---|---|---|
| JP | 2005186672 | A | * | 7/2005 |
| JP | 2014-189178 | A | | 10/2014 |
| JP | 2014189178 | A | * | 10/2014 |
| JP | 2015-058892 | A | | 3/2015 |
| KR | 20110072657 | A | | 6/2011 |
| WO | 2010/073273 | A1 | | 7/2010 |

* cited by examiner

VEHICLE TYRE WITH ENHANCED BEAD CONTOUR

The present invention relates to a tyre with a bead portion designed for improved rim fitment. The invention also relates to a wheel assembly of a tyre and rim with an improved contact force.

In general, in a vehicle wheel, the tyre is coupled to the rim by means of the interaction between its radially inner end portions, the so-called bead area, and the rim itself. The bead-rim connection represent the only connection of the tyre to the vehicle and is therefore crucial to transfer the forces of the car to the tyres and subsequently the road. The tyre is attached to the rim via contact forces between the bead area of the tyre and the rim.

The bead area of the tyre has to serve several purposes. The area from the bead toe to the outside of the bead resting adjacent to the wheel flange is the only part of the tyre in contact with the wheel and must transmit the full torque developed by the vehicle through the tyre to the road. This area of contact is also needed to hold the tyre onto the wheel in spite of severe lateral and longitudinal forces. Finally, this area must also act as a barrier to seal against air loss. Since the bead area is the sole contact point of the tyre and the rim, this area affects the tyre's ride and handling performance, uniformity and durability.

The part of the bead area at the outer side of the tyre, commonly known as the flange area, is fitted in the rim flange. In conventional bead contours the location of contact and the contact area between tyre bead and rim flange is not exactly defined, but depends on the tolerances of the rim flange shape. The undefined contact between tyre and rim flange may lead to excessive heat generation in the contact region, especially in the case of tyres for a high (HP) or a very high (UHP) performance car, including sporting uses, or in the case of tyres subjected to very high axial and radial loads. This results in durability issues such as rim chafing and failure of the tyre construction. As contact forces can vary between bead and rim flange and from rim to rim, nonlinear cornering behaviour and non-consistent bead durability will occur.

As the bead-rim interaction affects both handling performance and durability, efforts have been undertaken to get a well-defined, optimized contact patch between bead and rim.

U.S. 2005/161140 describes a bead area geometry that has been developed to improve the performance of the bead area, particularly reducing rim slip. The disclosed area geometry improves the tire uniformity and reduces the number of tire adjustments made for reducing tire vibration. More specifically, it describes a pneumatic tire which has a carcass structure extending through a pair of opposing bead portions and an inner liner located inward of the carcass structure, each bead portion comprising a bead core about which is wrapped the carcass structure and a toeguard. Each bead portion has a bead toe, a bead base, and a bead heel, the bead base extending between the bead toe and the bead heel. The bead heel has a profile corresponding to a sector of an ellipse or approximates a sector of an ellipse by having a dual radius structure. The bead base may have a dual taper configuration. The bead core may be substantially centred in the bead portion, as determined by the material thickness at three locations about the bead core.

U.S. 2825383 describes a sealing means between the tire beads and tire rim which is maintained throughout the unavoidable motion between the tire beads and tire rim. In order to allow the bead portion to seat firmly on the rim shoulder a tubeless tire mounted on a conventional drop-centre rim is provided with a rubber O-ring between them.

KR 20110072657 describes a vehicle tire with improved bead to quantitatively recognize loads exerted on the tire from the extent that the bead portions are pressed by a rim flange. The vehicle tire comprises a tread, sidewalls on both sides of the tread, bead portions on both ends of the sidewalls, and an annular protrusion which is installed on the outer side of a hump strip being in contact with a rim. The annular protrusion comprises three projection lines arranged at regular intervals, where the cross section of each projection line is 1-2 mm wide and 1-2 mm high.

EP 2373496 for example, describes a wheel comprising a tyre and a rim, wherein the tyre comprises: a pair of beads, each of said beads being provided with a base, wherein the rim comprises a pair of axially outer flanges delimiting respective bead housing seats each of the bead housing seats comprising a base portion and wherein the base of at least one of said beads and the base portion of the respective bead housing seat are mutually coupled by means of at least one mechanical coupling element; wherein the mechanical coupling element is provided with parts and has a length greater than its width; the length being lower than the circumference of the tyre measured at the base of the bead and the width being lower than the axial width of the base of the bead and of the base portion of the respective bead housing seat.

The present invention has the object of providing a tyre with a high contact force between the bead area and rim in order to minimize rim slippage and rim chafing as well as increasing the overall handling performance. This is especially desirable for ultra-high performance tyres and tyres under heavy load conditions. The present invention has the object of providing a tyre which imparts a high contact force to any rim it can be mounted to.

According to the invention this object is achieved by a tyre according to claim 1 and a wheel according to claim 9. Further embodiments are described in the dependent claims. They may be combined freely unless the context clearly indicates otherwise.

The tyre according to the invention is a pneumatic tyre for mounting on a passenger car vehicle and for rolling in a rolling direction when mounted on the vehicle. The tyre can be mounted onto a vehicle by way of mounting the tyre onto a rim and mounting the rim onto an axle of the vehicle.

A tyre generally may comprise several parts. Typical parts include the tread portion, the shoulders, the sidewalls, the bead, carcass, belt and inner liner. The tread portion is the part that comes in direct contact with the road when driving. The shoulders are located between the tread and the sidewalls and act as a transition between tread and sidewall, for which reason they may be thicker than the sidewall areas.

The flexible sidewalls are located between the shoulder and bead, protect the carcass and enhance the ride. They are also used to indicate the type, size, structure, pattern, manufacturing company, product name and the like of the tyre.

The carcass represents the tyre structural framework and acts to support air pressure, vertical load and absorb shocks. The breaker is a cord layer placed between the carcass and the tread in order to protect the carcass of a tyre. The breaker reduces shocks, prevents rips or injury of the tread from reaching the carcass directly while also stopping the separation between the rubber layer and the carcass.

The belt is a strong reinforcement found between the tread and the carcass in a radial or belted bias tyre. It functions much like the breaker but also increases tread rigidity by tightly winding about the carcass.

The inner liner is made of a layer of rubber that resists air diffusion and replaces the inner tube within a tyre. Generally made of a (halogenated) butyl rubber, the inner liner maintains the air inside the tyre.

The bead is the part of the tyre that attaches the tyre to the rim and wraps the end of the tyre's cord fabric. Comprised of the bead wire, core, flipper and other parts, the bead is generally designed to be slightly tight around the rim so that in the case of a sudden drop in inflation pressure, the tyre will not fall off the rim.

A rim comprises a pair of rim flanges each receiving a bead outside surface of a tyre, a pair of rim seats each extending inwardly from the rim flange and receiving the bead base surface of a tyre, and a well region between the rim seats. The rim flange and rim seat are smoothly connected to each other through a curvature heel region.

The wheel assembly comprises the tyre and a standard rim. When assembling the tyre in the standard rim, the bead base surface is seated on the rim seat of the standard rim, and the bead outside surface abuts against the rim flange.

The rims are regulatory determined by the industry standards in force in the region where the tyres are produced or used. For example, the industry standards in Europe are found in the "Standards Manual" of the ETRTO (The European Tyre and Rim Technical Organization); the industry standards in the US are found in the "Year Book" of the TRA (The Tire and Rim Association, Inc.); and the industry standards in Japan are found in the "JATMA Year Book" of the Japan Automobile Tyre Manufacturers' Association (JATMA). Furthermore, a "standard rim" refers to a rim which is stipulated in these standards according to the size of the tyre.

The present invention will be described in more detail with reference to the following figures and examples without wishing to be limited by them.

Figure 2:
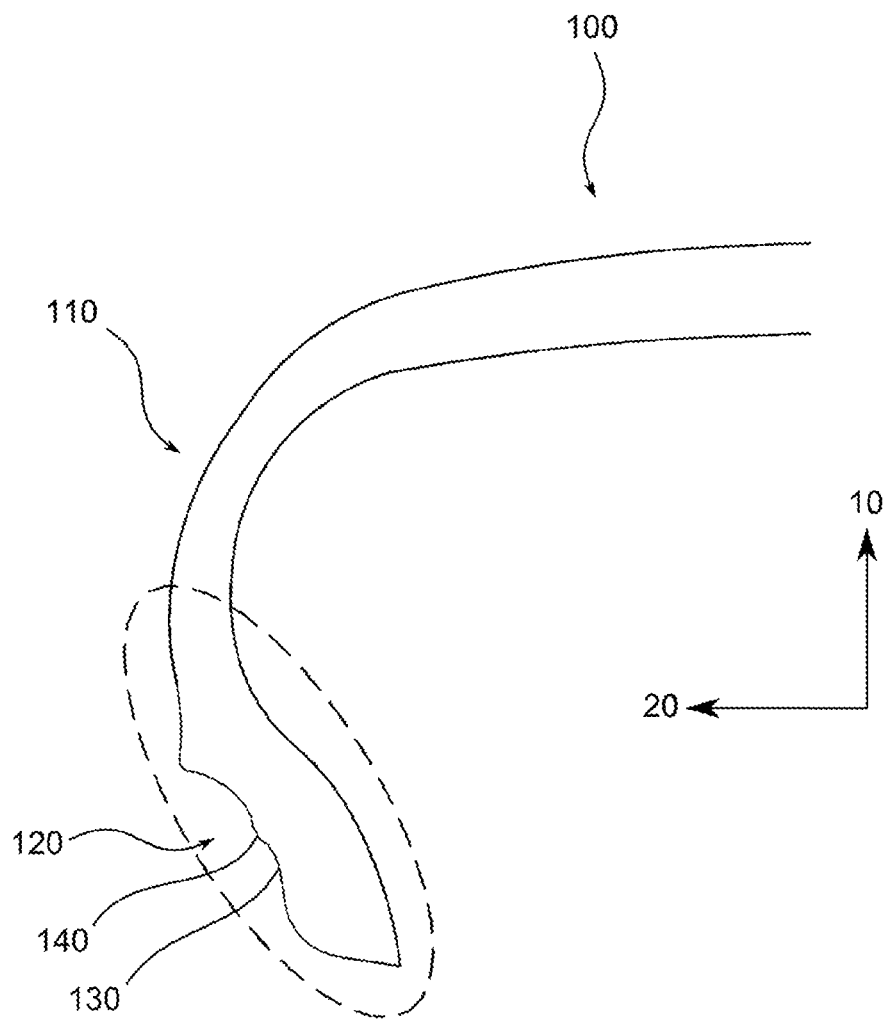
Figure 3:
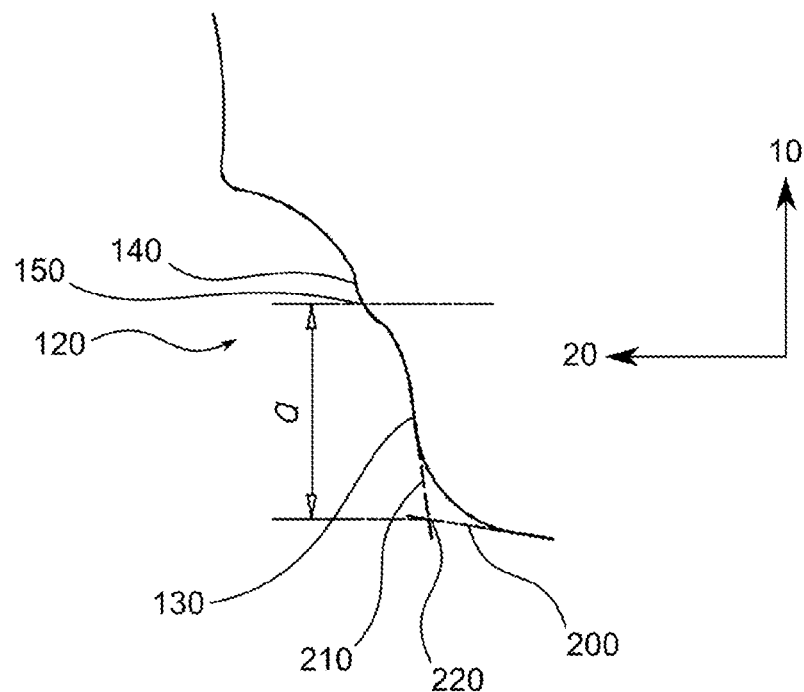
Figure 4:
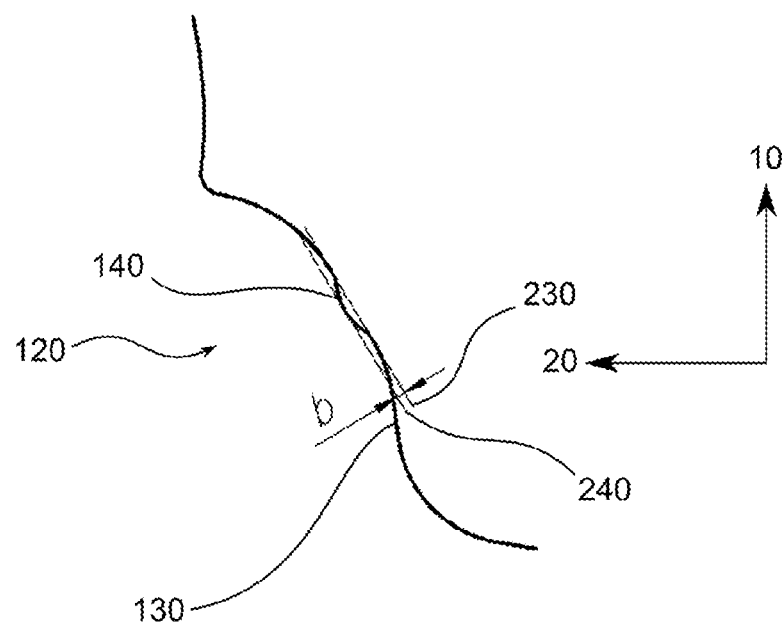
Figure 5:
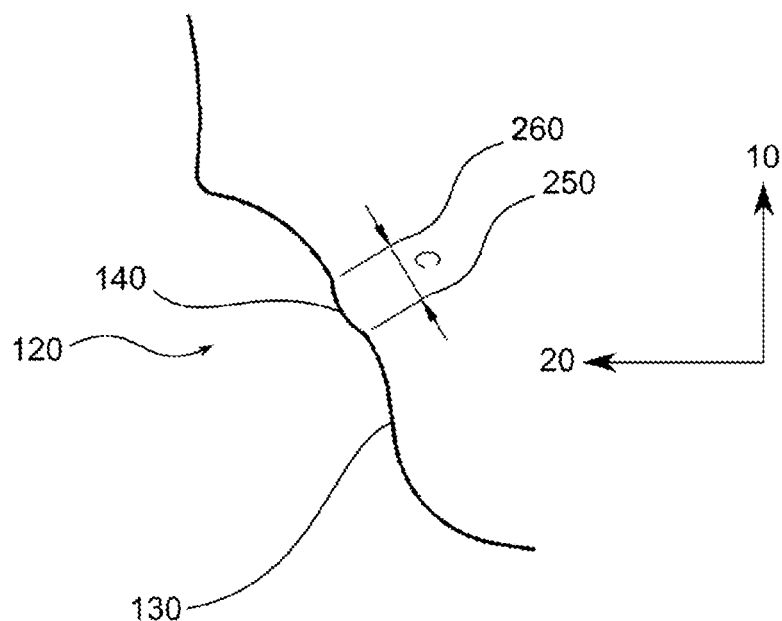
Figure 6:
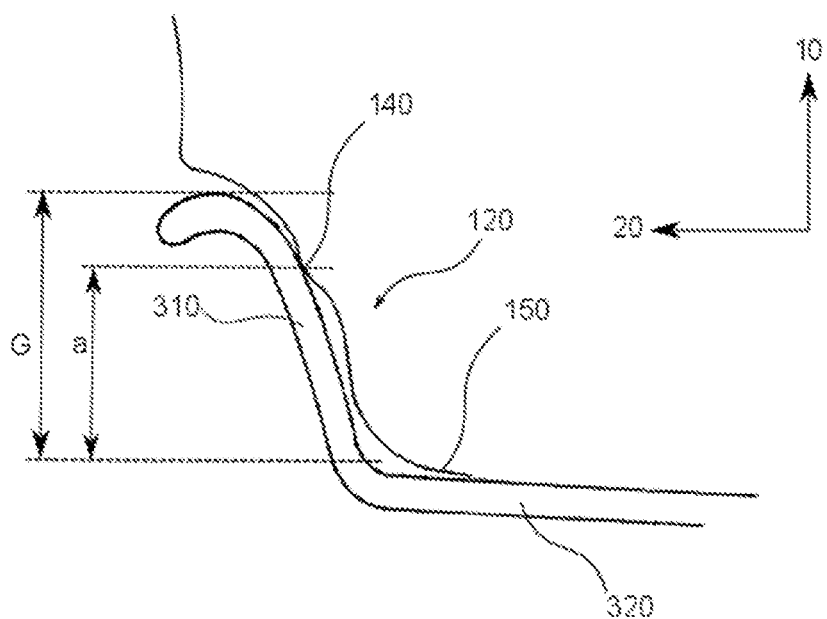

FIG. 1 shows a section including the bead portion of a tyre according to the prior art in cross-sectional view FIG. 2 shows a section including the bead portion of a tyre according to the invention in cross-sectional view FIG. 3 shows a section of the bead portion of an embodiment of the tyre according to the invention in cross sectional view FIG. 4 shows a section of the bead portion of an embodiment of the tyre according to the invention in cross sectional view FIG. 5 shows a section of the bead portion of an embodiment of the tyre according to the invention in cross sectional view FIG. 6 shows a section of the wheel assembly of the tyre and the rim according to this invention in cross sectional view.

FIG. 1 schematically shows a part of a cross-section of a tyre according to the prior art. The arrow with the reference numeral 10 defines a radial direction and points in a radially outward direction. The arrow with the reference numeral 20 defines an axial direction and points in a radially outward direction.

The prior art tyre comprises a tread portion 30, a pair of opposing sidewall portions 40 and a pair of opposing bead portions 50. The tread portion 30 extend radially outwards from the sidewall portions 40 and the sidewall portions 40 extend radially outwards from the bead portions 50. Each bead portion 50 comprises an axially inward side and an axially outward side which are joined at a base of the bead portion 50 and each axially outward side of the bead portion 50 comprises a concave region 60 extending axially inwards. The concave region is commonly referred to as the bead flange. The base of the bead is commonly known as the bead base.

FIG. 2 schematically shows a part of a cross-section of a tyre according to the invention. The arrow with the reference numeral 10 defines a radial direction and points in a radially outward direction. The arrow with the reference numeral 20 defines an axial direction and points in a radially outward direction. This also applies to the subsequent figures.

The pneumatic tyre according to the invention comprises a tread portion 100, a pair of opposing sidewall portions 110 and a pair of opposing bead portions 120. The tread portion 100 extends radially outwards from the sidewall portions 110 and the sidewall portions 110 extend radially outwards from the bead portions 120.

Each bead portion 120 comprises an axially inward side and an axially outward side which are joined at a base of the bead portion 120 and each axially outward side of the bead portion 120 comprises a concave region 130 extending axially inward. Each concave region 130 further comprises a convex region 140 located within the concave region 130 which extends axially outwards.

The convex region 140 is adapted to come into contact with a flange region of a rim in a wheel assembly. If the contact area between the tyre and rim flange is not well-defined, rim slippage and excessive heat generation are a direct consequence, leading to more rim chafing. In addition, the handling of the tyre will suffer.

The existence of the convex region 140, which may also be viewed as an elevated surface in the concave region 130 where the axially outward side of the bead portion would come into contact with a rim flange in a wheel assembly, results in a predefined small contact area between the bead and the rim. Without being bound to theory, it is believed that as a consequence the contact forces between a rim flange and outer bead portion are increased, resulting in minimised slip between bead and rim flange. Moreover, the high contact forces stabilise the bead portion, resulting in improved handling performance.

The convex region 140 can be distinguished from the rim cushion and other potential protrusions in the bead area by its position. The convex region is located in the concave region of the bead, which is a contact area of the tyre and rim flange. Hence, it will be in direct contact with a rim flange upon rim seating.

It is possible that the convex area 140 comprises the same material as the axially outward side of the bead portion 120. It is also possible that the convex area 140 comprises a material that differs from the axially outward side of the bead portion 120. This offers the flexibility to have different properties in the convex area 140 and the rest of the bead portion 120. For example, the convex area 140 can be made stiffer than the outer bead portion 120. In the latter case the convex area 140 can contribute to a tight rim seating, whereas the softer bead portion 120 can improve other properties such as ride comfort.

FIG. 3 schematically shows a cross-sectional view of the bead portion 120 of a tyre according to the invention which has already been presented in FIG. 2 and further introduces a geometric descriptor designated as "a". The section shows the axially outward side of the bead portion 120, comprising the concave region 130 extending axially inwards. Within the concave region 130, a convex region 140 is located which extends axially outwards. The convex region 140 comprises a vertex 150 and the base of each bead portion 120 comprises a linear section whose axially outward extension defines a first extending line 200. The concave region 130 comprises a linear section located radially inwards from the convex region 140 whose radially inward extension defines a second extending line 210 and the intersection of the first extending line 200 and the second extending line 210 defines an intersection point 220.

In one embodiment of the tyre according to the invention, the radial component of the distance a between the vertex 150 of the convex region 140 and the intersection point 220 is ≥5 to ≤17 mm, preferably ≥10 to ≤17 mm, more preferred ≥12 to ≤16 mm. As can be seen from FIG. 3, a straight line between intersection point 220 and vertex 150 would not be parallel to the radial direction 10. This embodiment is concerned with the distance as seen in radial direction. Hence, only the radial component of the distance is considered.

FIG. 4 schematically shows a cross-sectional view of the bead portion 120 of a tyre according to the invention which has already been presented in FIG. 2 and further introduces a geometric descriptor designated as "b". The section shows the axially outward side of the bead portion 120, comprising the concaved region 130 extending axially inwards. Within the concave region, a convex region 140 is located which extends axially outwards. The convex region 140 extends from the concave region 130 by a height b. The base of the concave region is designated by the line 230. Line 240 which is parallel to line 230 contacts the vertex of the convex region 140. The height b is the distance indicated between the lines 230 and 240.

In another embodiment of the tyre according to the invention, the convex region 140 extends from the concave region 130 at a height b which is ≥0.03 to ≤3 mm. Preferably, the height b is ≥0.05 to ≤0.5 mm.

It is believed that the height b should not be too small, as the contact force needs to be sufficiently large to reduce rim slippage and heat build-up. At the other hand the height should not be too large either, as this could lead to distortion of the whole bead area upon rim seating, and might lead to reduction of the overall contact area of the bead.

FIG. 5 schematically shows a cross-sectional view of the bead portion 120 of a tyre according to the invention which has already been presented in FIG. 2 and further introduces a geometric descriptor designated as "c". The section shows the axially outward side of the bead portion 120, comprising the concaved region 130 extending axially inwards. Within the concave region, a convex region 140 is located which extends axially outwards. The convex region 140 has a width c. This width is measured as the distance between one end of the convex region 140 within the concave region 130 (indicated with reference numeral 250) and the other end (reference numeral 260). In another embodiment of the invention the width c is ≥0.1 to ≤10 mm, preferably ≥1 to ≤7 mm.

In another embodiment of the tyre according to the invention the ratio of the height b to the width c of the convex region is ≤0.5. More preferred, the ratio of the height b to width c of the convex region is ≤0.1.

It is assumed that with a larger volume at the base of the convex region the durability of the convex region is improved. In addition, it is assumed that a higher volume is able to transfer higher forces from the contact point to the tyre, thereby enhancing the handling performance even further.

In another embodiment of the tyre according to the invention a single convex region 140 is present in each concave region 130. By applying a single, annular contact point with the rim, the contact force will be maximized at this point, thereby minimizing rim chafing issues.

The shape of the convex region 140 (as seen in its cross-section) is not limited per se. For example, the convex region 140 may have a semi-circular, semi-oval or semi-elliptical cross-section. The convex region 140 may also have a triangular shaped or higher n-polygonal shaped cross-section (n=2, 3, 4, 5, 6 . . . ). In the latter case, it will only constitute the half of a polygonal. Preferably, the convex region 140 has a semi-elliptical cross-section.

In another embodiment of the tyre according to the invention the convex area is preferably of a rubber material common in the bead are with a shore A hardness of ≥95 to ≤60, preferably ≥75 to ≤65. This property can be determined according to ASTM standard D2240.

In another embodiment of the tyre according to the invention the convex region 140 is an annular convex region throughout the tyre. This may be elucidated in that there are no cross-sectional views of the tyre as depicted in FIGS. 2 to 6 in which there is no convex region 140.

A further aspect of the present invention is a wheel comprising a tyre according to the invention and a rim which will be described in greater detail in connection with FIG. 6 as outlined below. This wheel assembly according to the invention contains a rim and tyre pair as described in the ETRTO or comparable international standards.

FIG. 6 schematically shows a cross-section of the bead portion of a wheel assembly of a tyre and a rim according to the invention which emphasizes the rim contact. The tyre section shows the axially outward side of the bead portion 120, comprising the concave region 130 extending axially inwards. Within the concave region 130, a convex region 140 is located which extends axially outwards. The distance a, as defined before, is also shown.

According to the invention, a wheel comprises a tyre according to the invention and a rim, wherein the rim comprises a pair of rim flanges 310 each receiving the axially outward side of the bead portion 120 of the tyre. The convex region 140 within the concave region 130 of the bead portion 120 of the tyre is directly contacting the rim flange 310 of the rim.

A rim generally comprises a pair of rim flanges each receiving a bead outside surface of a tyre, a pair of rim seats each extending inwardly from the rim flange and receiving the bead base surface of a tyre, and a well region between the rim seats. The rim flange and rim seat are smoothly connected to each other through a curvature heel region. The rim section shows the rim flange 310 and the bead seat 320. The rim flange height G is defined according to the ETRTO standards.

In an embodiment of the wheel according to the invention, the rim has a rim flange height G as defined according to the ETRTO standards and the ratio of the distance a to the height G (according to the ETRTO standards) is ≥50 to ≤100%, preferably ≥75 to ≤95%.

EXAMPLES

A tyre according to the invention was subjected to both indoor and outdoor testing. The tested tyre size was 245/40R18. The convex region was semi-ellipse shaped, the distance a (cf. FIG. 3) was 15.7 mm, the width c (cf. FIG. 5) was 5 mm and the height b (cf. FIG. 4) was 0.1 mm.

The convex portion was made of the same material as the axially outward side of the bead portion and had a Shore A Hardness of 71.

The tyre was fitted to a rim, selected by ETRTO standards. The contact point between the flange area and the convex region of the wheel assembly corresponds to a ratio of the distance a to the rim flange height G (cf. FIG. 6) to of 92%.

The reference tyre had exactly the same specifications as the test tyre, however the bead region did not contain the convex region.

The tyre according to the invention and a reference tyre were subjected to a bead durability test. For this purpose, the FMVSS No. 139 endurance test S 6.3 was performed with a significant extended running time. After the extended endurance test, the beads were checked for rim chafing. The reference tyre showed significant more rim chafing than the tyre according to the invention.

In addition, the tyre according to the invention and the reference tyre were tested for subjective handling. The tyre according to the invention scored significantly better on categories such as steering performance, stability and comfort. The subjective handling was scored on a scale from 1-10. The subjective handling score of the tyre according to the invention was on average 0.7 points higher than the tyre according to the invention.

In summary, the tyre according to the invention reduces rim chafing and improves handling performance, by increasing the contact force between the bead and the rim by the addition of such a convex region at the flange area of the bead.

The invention claimed is:

1. A pneumatic tyre comprising a tread portion, a pair of opposing sidewall portions and a pair of opposing bead portions, the tread portion extending radially outwards from the sidewall portions and the sidewall portions extending radially outwards from the bead portions, wherein each bead portion comprises an axially inward side and an axially outward side which are joined at a base of the bead portion and each axially outward side of the bead portion comprises a concave region extending axially inwards, wherein the concave region of the bead portion is configured as a contact area to a rim flange of a standard rim having a rim flange height (G) such that when the tyre is assembled in the standard rim and upon rim seating, the concave region of the bead portion is a contact area of the tyre to the rim flange and abuts against the rim flange, and wherein each concave region further comprises a convex region located within the concave region which extends axially outwards, wherein in a cross-sectional view the convex region is semi-elliptical, the convex region comprises a vertex, the base of each bead portion comprises a linear section whose axially outward extension defines a first extending line, the concave region comprises a linear section located radially inward from the convex region whose radially inward extension defines a second extending line, an intersection of the first extending line and the second extending line defines an intersection point;

a radial component of a distance (a) between the vertex of the convex region and the intersection point is ≥5 to ≤17 mm; and the convex region is located such that when the tyre is assembled in the standard rim and upon rim seating the ratio of the distance (a) to the height (G) is ≥50 to ≤100%.

2. The tyre according to claim 1, wherein in a cross-sectional view the convex region extends from the concave region at a height (b) which is ≥0.03 to ≤3 mm.

3. The tyre according to claim 1, wherein in a cross-sectional view the convex region has a width (c) which is ≥0.1 to ≤10 mm.

4. The tyre according to claim 1, wherein a ratio of a height (b) to a width (c) is ≤0.5.

5. The tyre according to claim 1, wherein a single convex region is present in each concave region.

6. The tyre according to claim 5, wherein the convex region has a semi-elliptical cross-section.

7. The tyre according to claim 1, wherein rubber material of the convex area has a shore A hardness of ≥60 to ≤95.

8. The tyre according to claim 1, wherein the convex region is an annular convex region throughout the tyre.

9. A wheel comprising a tyre according to claim 1 and a rim, wherein the rim comprises a pair of rim flanges each receiving the axially outward side of the bead portion of the tyre, wherein the concave region of the bead portion is the contact area of the tyre to the rim flange, and wherein the convex region within the concave region of the bead portion of the tyre is directly contacting the rim flange of the rim.

10. A wheel according to claim 9, the rim having a rim flange height (G) as defined according to the ETRTO standards, wherein the tyre in a cross-sectional view, the convex region comprises a vertex, the base of each bead portion comprises a linear section whose axially outward extension defines a first extending line, the concave region comprises a linear section located radially inwards from the convex region whose radially inward extension defines a second extending line, the intersection of the first extending line and the second extending line defines an intersection point and a radial component of a distance (a) between the vertex of the convex region and the intersection point is ≥5 to ≤17 mm, and a ratio of the distance (a) to the height (G) (according to the ETRTO standards) is ≥50 to ≤100%.

* * * * *